United States Patent
Neystadt et al.

(10) Patent No.: US 8,955,108 B2
(45) Date of Patent: Feb. 10, 2015

(54) SECURITY VIRTUAL MACHINE FOR ADVANCED AUDITING

(75) Inventors: John Neystadt, Kfar-Saba (IL); R. Eric Fitzgerald, Bellevue, WA (US); Leonid Verny, Hertzelya (IL)

(73) Assignee: Microsoft Corporation, Redmond, WA (US)

( * ) Notice: Subject to any disclaimer, the term of this patent is extended or adjusted under 35 U.S.C. 154(b) by 1080 days.

(21) Appl. No.: 12/485,930

(22) Filed: Jun. 17, 2009

(65) Prior Publication Data

US 2010/0325727 A1 Dec. 23, 2010

(51) Int. Cl.
*G06F 21/53* (2013.01)
*G06F 11/34* (2006.01)

(52) U.S. Cl.
CPC ............ *G06F 21/53* (2013.01); *G06F 11/3476* (2013.01); *G06F 2201/815* (2013.01)
USPC ..................... 726/22; 726/23; 726/24; 726/25

(58) Field of Classification Search
CPC .................. G06F 11/1471; G06F 2009/45587; G06F 11/3476; G06F 11/147; G06F 21/53; G06F 2201/815; H04L 41/0853
USPC .............................. 726/22–25; 709/224; 718/1
See application file for complete search history.

(56) References Cited

U.S. PATENT DOCUMENTS

| | | | | |
|---|---|---|---|---|
| 5,978,475 | A * | 11/1999 | Schneier et al. | 713/177 |
| 6,405,318 | B1 * | 6/2002 | Rowland | 726/22 |
| 6,775,779 | B1 * | 8/2004 | England et al. | 726/26 |
| 7,073,071 | B1 * | 7/2006 | Ellison et al. | 713/193 |
| 7,712,095 | B2 * | 5/2010 | Toyota et al. | 718/1 |
| 7,979,494 | B1 * | 7/2011 | Golovin et al. | 709/206 |
| 8,307,443 | B2 * | 11/2012 | Wang et al. | 726/24 |
| 2002/0129274 | A1 * | 9/2002 | Baskey et al. | 713/201 |
| 2003/0061483 | A1 * | 3/2003 | Schell et al. | 713/166 |
| 2003/0101322 | A1 * | 5/2003 | Gardner | 711/163 |
| 2003/0233571 | A1 * | 12/2003 | Kraus et al. | 713/200 |
| 2005/0033980 | A1 * | 2/2005 | Willman et al. | 713/200 |
| 2005/0223164 | A1 * | 10/2005 | Kitamura | 711/112 |
| 2005/0268336 | A1 * | 12/2005 | Finnegan | 726/15 |

(Continued)

OTHER PUBLICATIONS

B.D. Payne, M.D.P. de Carbone; Lee Wenke: "Secure and flexible monitoring of Virtual Machines", Computer Security Applications Conference, ACSAC, 2007, Florida.*

(Continued)

*Primary Examiner* — Catherine Thiaw
(74) *Attorney, Agent, or Firm* — Henry Gabryjelski; Kate Drakos; Micky Minhas

(57) ABSTRACT

A security system collects an audit trail on a computer outside of a boundary created by one or more virtual machines. The security system uses a privileged virtual machine to collect audit logs for each protected virtual machine. As the protected virtual machines run, they send auditing information to the privileged virtual machine. The privileged virtual machine can collect auditing information from protected virtual machines much more quickly than a network server, as well as collecting auditing events from multiple protected virtual machines. Because the auditing destination is located on the same computer as the virtual machine monitored by the audit trail, no network dependency is present. Thus, the security system allows for monitoring the activity of administrators and other users while preventing tampering with the audit trail of each user's actions.

20 Claims, 4 Drawing Sheets

(56) References Cited

U.S. PATENT DOCUMENTS

| | | | |
|---|---|---|---|
| 2005/0283660 A1* | 12/2005 | McKeen et al. | 714/11 |
| 2006/0015719 A1* | 1/2006 | Herbert et al. | 713/164 |
| 2006/0031937 A1* | 2/2006 | Steinberg | 726/24 |
| 2006/0112416 A1* | 5/2006 | Ohta et al. | 726/1 |
| 2006/0136720 A1* | 6/2006 | Armstrong et al. | 713/164 |
| 2006/0136910 A1* | 6/2006 | Brickell et al. | 718/1 |
| 2006/0225065 A1* | 10/2006 | Chandhok et al. | 717/168 |
| 2006/0225073 A1* | 10/2006 | Akagawa et al. | 718/1 |
| 2006/0236127 A1* | 10/2006 | Kurien et al. | 713/193 |
| 2006/0248591 A1* | 11/2006 | Day et al. | 726/25 |
| 2007/0005919 A1* | 1/2007 | van Riel | 711/163 |
| 2007/0028244 A1 | 2/2007 | Landis et al. | |
| 2007/0043860 A1* | 2/2007 | Pabari | 709/224 |
| 2007/0106986 A1 | 5/2007 | Worley | |
| 2007/0234412 A1* | 10/2007 | Smith et al. | 726/11 |
| 2008/0028410 A1* | 1/2008 | Cherkasova et al. | 718/104 |
| 2008/0184225 A1* | 7/2008 | Fitzgerald et al. | 718/1 |
| 2008/0196043 A1* | 8/2008 | Feinleib et al. | 719/319 |
| 2009/0049453 A1* | 2/2009 | Baran et al. | 719/313 |
| 2009/0089879 A1* | 4/2009 | Wang et al. | 726/24 |
| 2009/0265756 A1* | 10/2009 | Zhang et al. | 726/1 |
| 2009/0276774 A1* | 11/2009 | Kinoshita | 718/1 |
| 2010/0011412 A1* | 1/2010 | Maximilien et al. | 726/1 |
| 2010/0071035 A1* | 3/2010 | Budko et al. | 726/4 |
| 2010/0107158 A1* | 4/2010 | Chen et al. | 718/1 |
| 2010/0122249 A1* | 5/2010 | Anderson et al. | 718/1 |
| 2010/0262722 A1* | 10/2010 | Vauthier et al. | 710/8 |
| 2011/0004935 A1* | 1/2011 | Moffie et al. | 726/23 |

OTHER PUBLICATIONS

Paul A. Karger, Mary E. Zurko, Douglas W. Bonin, Andrew H. Mason, Clifford E. Kahn: 'A VMM Security Kernel for the VAX Architecture', IEEE, 1990, pp. 2-19.*

Soman, et al., "Detecting Malicious Java Code Using Virtual Machine Auditing", retrieved at <<http://www.usenix.org/event/sec03/tech/full_papers/soman/soman_html/>>, Proceedings of the 12th USENIX Security Symposium, Aug. 4-8, 2003,pp. 16.

Seiden, et al., "The Auditing Facility for a VMM Security Kernel", retrieved at <<http://ieeexplore.ieee.org/stamp/stamp.jsp?arnumber=63856&isnumber=2323>>, In Proceedings of 1990 IEEE Computer Society Symposium on Research in Security and Privacy, May 7-9, 1990, pp. 262-277.

Cowper, Bruce, "Virtualization Security", retrieved at <<http://www.infosecuritycanada.com/images/100358/2008_PDFs/Cowper_Virtualization_Security.pdf>>, InfoSecurity Canada, 2008. pp. 34.

Mergen, et al., "Virtualization for High-Performance Computing", retrieved at <<http://www.research.ibm.com/K42/papers/osr06-virt.pdf>>, ACM SIGOPS Operating Systems Review, vol. 40, No. 2, Apr. 2006, pp. 4.

Garfinkel, et al., "A Virtual Machine Introspection Based Architecture for Intrusion Detection", retrieved at <<http://www.isoc.org/isoc/conferences/ndss/03/proceedings/papers/13.pdf>>, In Proceedings of Network and Distributed Systems Security Symposium, Feb. 6-7, 2003, pp. 16.

Stumpf, et al., "NoSE—Building Virtual Honeynets Made Easy", retrieved at <<http://www.ito.tu-darmstadt.de/publs/pdf/StumpfEtAl-NoSE-buildingVirtualHoneynets.pdf>>, In Proceedings of the 12th International Linux System Technology Conference, Oct. 2005, pp. 11.

Dunlap, et al., "ReVirt: Enabling Intrusion Analysis through Virtual Machine Logging and Replay", retrieved at <<http://www.usenix.org/events/osdi02/tech/full_papers/dunlap/dunlap_html/index.html>>, Proceedings of the 5th Symposium on Operating Systems Design and Implementation, Dec. 9-11, 2002, pp. 1-18.

* cited by examiner

SECURITY VIRTUAL MACHINE FOR ADVANCED AUDITING

BACKGROUND

One objective of computer security includes protection of information and property from theft, corruption, or natural disaster, while allowing the information and property to remain accessible and productive to authorized users. There are various strategies and techniques used to design secure operating systems. One technique enforces the principle of least privilege, where an entity has only the privileges that it uses for its function. That way even if an attacker gains access to one part of the system, fine-grained security ensures that it remains difficult for the attacker to access the rest of the system. Other techniques include subsystems that default to secure settings, and wherever possible are designed to "fail secure" rather than "fail insecure." Ideally, a secure system can only be breached by a deliberate, conscious, knowledgeable, and free decision on the part of legitimate authorities. To address this, designers and operators of secure systems often assume that security breaches are inevitable and keep full audit trails of system activity to determine the mechanism and extent of security breaches after they occur.

One method of securing computer systems involves creating user roles, and assigning users to roles that limit the authority of the user to only those activities that the user is authorized to perform. For example, an operating system may have a concept of an administrator, a power user, and a limited user, each with fewer privileges than the previous. Separation of administrative privileges from normal user privileges makes an operating system more resistant to viruses and other malware. A system administrator, systems administrator, or sysadmin, is a person employed to maintain and operate a computer system and/or network. System administrators may be members of an information technology (IT) department. The duties of a system administrator are wide-ranging, and vary widely from one organization to another. System administrators are usually charged with installing, supporting, and maintaining servers or other computer systems, and planning for and responding to service outages and other problems. The term system administrator may also be used to describe a privilege level that a computer owner has to obtain on his or her own computer to perform certain actions even if the computer is not part of a larger system.

A common threat is a corrupt administrator or a malicious piece of software that manages to acquire administrative rights and attack a computer system to gain unauthorized access, steal data, or tamper with the computer system. For many systems, once a malicious user or application has administrative privileges the security design is foiled and all security is lost. To mitigate this threat, system designers employ auditing systems that ensure an audit trail is created for actions performed by any user, even an administrator. However, this leaves a risk that the audit trail can be modified or erased by the same malicious administrator, claimed to be erroneous, or claimed to originate from malware of which the administrator is not aware. There are systems, such as Microsoft Operations Manager 2007's Audit Collection Services (ACS) that collect audit trails from computers and copy them to a centralized database on a network server that potentially malicious administrators do not control. However, this introduces a dependency on such a server, which may add network latency overhead and limited reliability when the network connection is unavailable. The administrator may even be able to sever the network connection to limit the effectiveness of such security models.

SUMMARY

A security system is described herein that collects an audit trail on a computer outside of a boundary created by one or more virtual machines. A virtual machine creates a conceptual boundary between a host operating system and the virtual machine, whereby the virtual machine is typically unaware that it is running virtually and unaware of the host. The security system uses a privileged virtual machine to monitor and protect the integrity of one or more guest virtual machines running on the same host by allowing the privileged virtual machine to collect audit logs for each protected virtual machine. The host invokes one or more protected virtual machines. As the protected virtual machines run, they send auditing information to the privileged virtual machine. The privileged virtual machine can collect auditing information from protected virtual machines much more quickly and reliably, without dependency on network operations compared to a network server, as well as collecting auditing events from multiple protected virtual machines, introducing an aggregation point. This reduces the risk that a rootkit or other malware can subvert auditing and enables auditing when a network is not yet available (e.g., during early operating system boot phase or periods of network failure). Because the auditing destination is located on the same computer as the virtual machine monitored by the audit trail, no network dependency is present. Thus, the security system allows for monitoring the activity of administrators and other users while preventing tampering with the audit trail of each user's actions.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A security system is described herein that collects an audit trail on a computer outside of a boundary created by one or more virtual machines. A virtual machine creates a conceptual boundary between a host operating system and the virtual machine, whereby the virtual machine is typically unaware that it is running virtually and unaware of the host. In some embodiments, the security system uses a privileged virtual machine (e.g., a parent or dedicated virtual machine) to protect the integrity of one or more protected virtual machines (sometimes called guests) running on the same host by allowing the privileged virtual machine to collect audit logs for each protected virtual machine. Before running any protected virtual machines, the host starts the privileged virtual machine so that logging is available before any protected virtual machine starts. The security system may not allow the privileged virtual machine to shut down while other protected virtual machines are still running to ensure that audit information collection is available throughout the lifetime of each protected virtual machine.

The host invokes one or more protected virtual machines. For example, an administrator may configure which virtual machines run on each host. As the protected virtual machines run, they send auditing information to the privileged virtual machine. For example, the protected virtual machines may send auditing information over a bus designed for communication between virtual machines (e.g., Microsoft VMBus), using a network connection (to the local machine, though the protected virtual machine may believe it is a remote machine), or using another communication channel. The privileged virtual machine can collect auditing information from protected virtual machines much more quickly and reliably than a network server, as well as collecting auditing events from multiple protected virtual machines, introducing an aggregation point. This reduces the risk that a rootkit or other malware can tamper with the integrity of a protected virtual machine and subvert auditing. Because the auditing destination is located on the same computer as the virtual machine monitored by the audit trail, no network dependency is present. Thus, the security system allows for monitoring the activity of administrators and other users while preventing tampering with the audit trail of each user's actions.

Figure 1:
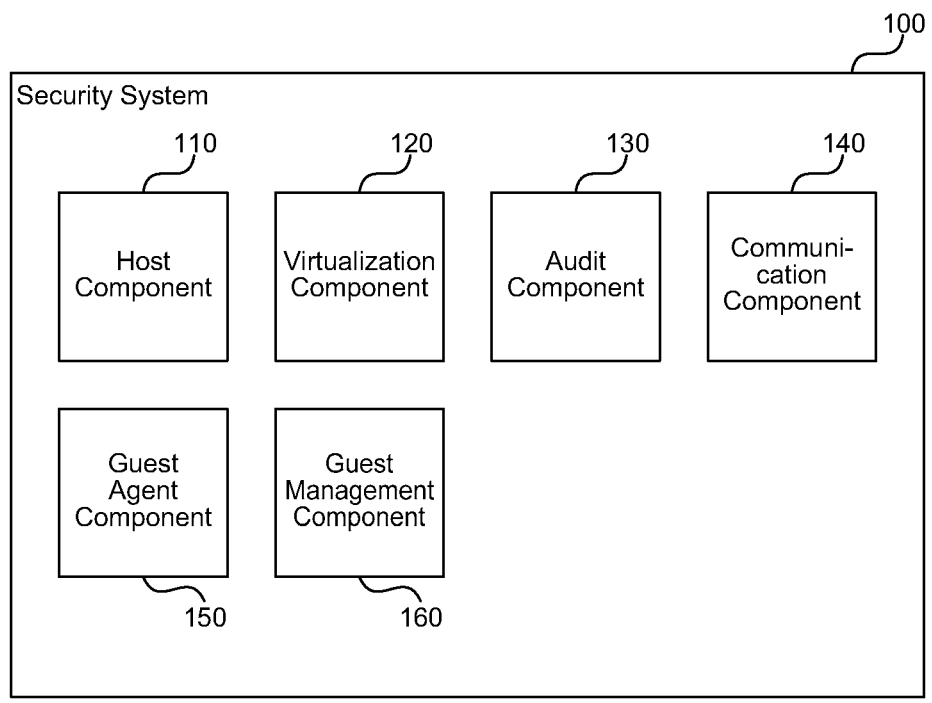
FIG. 1 is a block diagram that illustrates components of the security system, in one embodiment.

FIG. 1 is a block diagram that illustrates components of the security system, in one embodiment. The system 100 includes a host component 110, a virtualization component 120, an audit component 130, a communication component 140, a guest agent component 150, and a guest management component 160. Each of these components is described in further detail herein.

The host component 110 provides a root partition that hosts one or more virtual child partitions that each includes a protected virtual machine. For example, the host component 110 may run an operating system, such as Microsoft Windows Server 2008, that includes a virtualization stack and devices drivers through which one or more virtual machines can interact with physical hardware on the same computer system. The host component 110 interacts with the virtualization component 120 to communicate with the physical hardware and the communication component 140 to communicate with the virtual machines.

The virtualization component 120 abstracts differences between physical hardware associated with the computer system and virtual hardware provided to each virtual machine. For example, the computer system may include a physical network interface card and the virtualization component 120 may present a different network interface card to a virtual machine. The virtualization component 120 manages any differences in the interface between the physical and virtual hardware. In some embodiments, the virtualization component 120 is implemented as a hypervisor that sits in a conceptual stack below the host operating system and each of the virtual machines to abstract the physical hardware from the root and child partitions.

The audit component 130 receives auditing information from each of the protected virtual machines. In some embodiments, the audit component 130 is implemented as a privileged virtual machine that the host operating system runs alongside the protected virtual machines. For example, the hypervisor of the virtualization component 120 may authorize the privileged virtual machine to receive auditing information from each protected virtual machine through the hypervisor. From the perspective of the protected virtual machine, the protected virtual machine may write auditing information to a network port, particular virtualization bus, or to a particular folder that the hypervisor makes available to the privileged virtual machine. Because of the inherent separation created by the boundary of virtual machines, a particular protected virtual machine cannot easily modify the auditing information, regardless of a privilege level of a user logged into the protected virtual machine. Alternatively or additionally, the audit component 130 may run on the host operating system directly (called the parent partition in some virtualization architectures), without a separate privileged virtual machine.

The communication component 140 provides a channel through which the audit component 130 receives auditing information. In some embodiments, the host operating system provides a virtualization bus (e.g., Microsoft VMBus), through which virtual machines can communicate with one another and with the host operating system. In some embodiments, the system 100 provides a guest agent component 150, described further herein, that runs within the protected virtual machine to collect auditing information and provide it through the communication component 140 to the auditing component 130.

The guest agent component 150 executes within a protected virtual machine to collect auditing information and send the auditing information to the auditing component 130 and is protected from tampering by the hypervisor. For example, the guest agent component 150 may collect audit files and send them over a virtualization bus or other communication method provided by the communication component 140 to extract auditing information from a protected virtual machine and communicate the information to a privileged virtual machine. The guest agent component 150 may be implemented as a device driver or other kernel-mode component of the protected virtual machine so that the agent has sufficient access to perform its function. In some embodiments, the system 100 may extend the hypervisor directly to collect auditing events directly without running a separate agent in each protected virtual machine.

The guest management component 160 manages each of the virtual machines. The guest management component 160 may be responsible for authorizing the privileged virtual machine with the hypervisor to receive auditing information from other virtual machines, starting the privileged virtual machines, starting each protected virtual machine, setting up the communication between each protected virtual machine and the privileged virtual machine, and so forth. The component 160 may also provide an interface where an authorized administrator can configure the system 100.

The computing device on which the security system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on. A "computer-readable storage medium", as used herein, encompasses statutory storage devices and media that are common in the art and does not include non-statutory transmission media or data signals.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
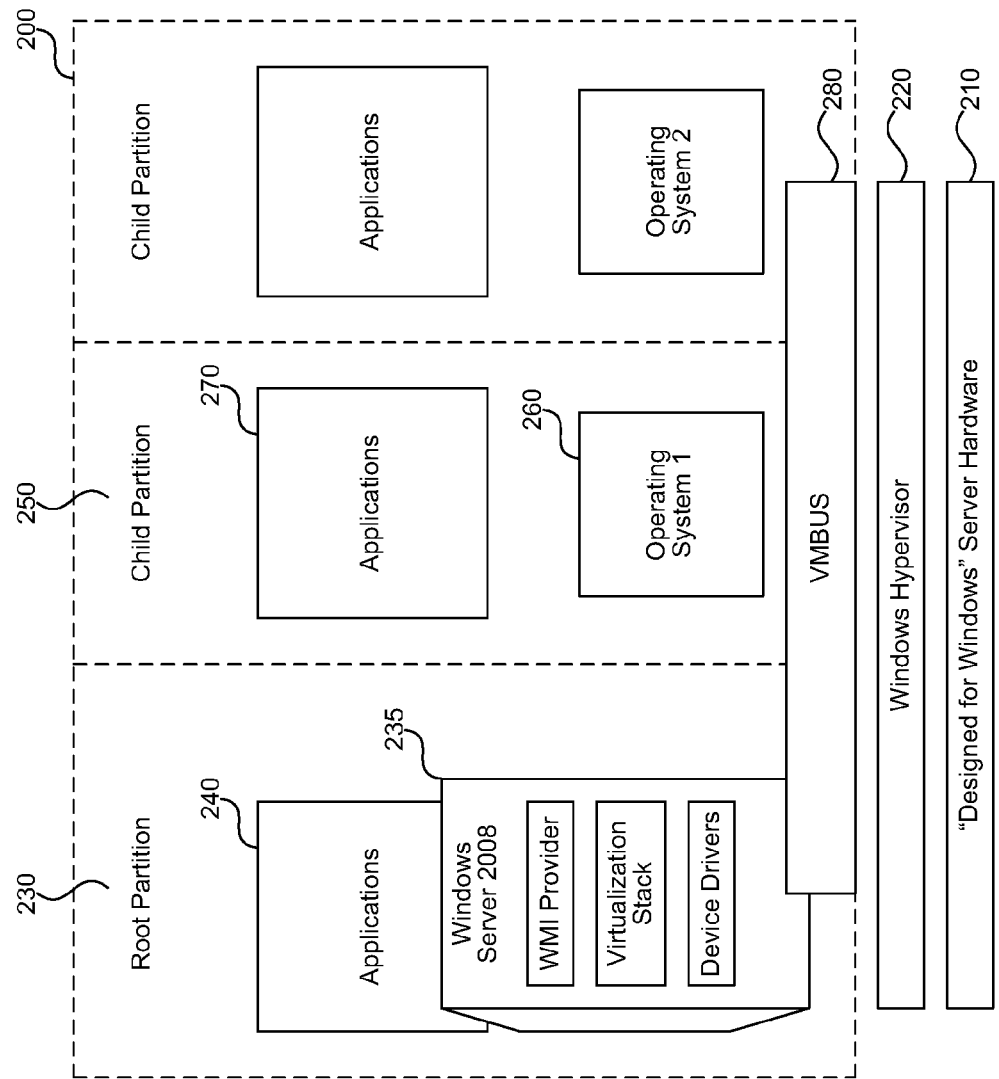
FIG. 2 is a block diagram that illustrates a typical virtual machine host operating environment, in one embodiment.

FIG. 2 is a block diagram that illustrates a typical virtual machine host operating environment, in one embodiment. The environment 200 represents the blocks of a stack running on a set of physical hardware components of a computer system. The bottom of the stack includes the physical hardware 210, which may include graphics cards, hard drives, network interface cards, processors, memory, and so forth. A hypervisor 220 is a thin software component that sits below and operating system kernel in the stack and allows the physical hardware 210 to be shared among multiple operating systems. Typically, one operating system resides in a root partition 230 and is the host operating system that manages one or more protected virtual machines. The root partition 230 may include a host operating system 235, and one or more applications 240 that run on the host operating system 235. One or more child partitions 250 include one or more protected virtual machines that may each have its own operating system 260 and applications 270 that access the hypervisor 220 through the operating system 260. The environment 200 may also include a dedicated bus 280 that allows for communication among the various operating systems. The dedicated bus 280 may include hardware or software components (e.g., a driver) that facilitate communication among the other components.

Figure 3:
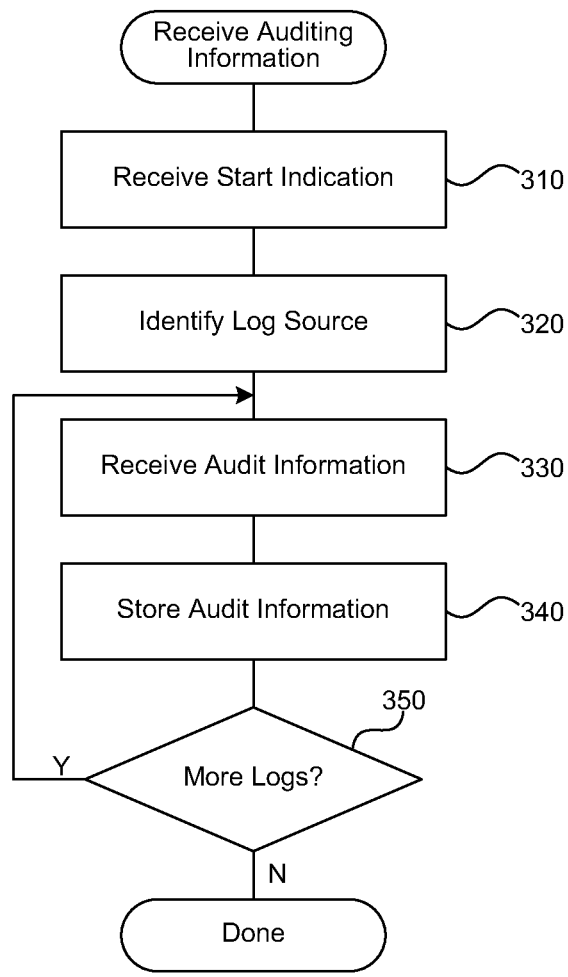
FIG. 3 is a flow diagram that illustrates the processing of the audit component to receive auditing information, in one embodiment.

FIG. 3 is a flow diagram that illustrates the processing of the audit component to receive auditing information, in one embodiment. The audit component is typically invoked by a host operating system. For example, the host operating system may start a privileged virtual machine that contains the audit component. Beginning in block 310, the component receives an indication to start collecting auditing information. For example, the host operating system may start a privileged virtual machine or an application that runs on the host operating system directly to collect audit logs. Continuing in block 320, the component identifies an auditing information source. For example, the component may enumerate a protected virtual machine for which the component will collect auditing information. The component may perform this and the following steps for each of the protected virtual machines hosted by the host operating system.

Continuing in block 330, the component receives auditing information from the identified source. For example, the system may receive a data packet over a network interface or virtualization interface. The component may receive information about one or more events as the events occur on a protected virtual machine. The events may include actions taken by an administrator or other user of high privilege. Continuing in block 340, the component stores the received auditing information along with identifying information about the source. Because the component receives auditing information from potentially multiple sources, the component can aggregate information from multiple protected virtual machines along with information indicating which protected virtual machine is the source of particular events. In some embodiments, the component waits for an acknowledgement (e.g., using transactional semantics) that storing the auditing information was successfully completed before performing the audited action to guarantee that an audit trail is created for every action.

Continuing in decision block 350, if the component is still collecting log information, then the component loops to block 330 to receive more log information, else the component completes. For example, the component may collect log information for as long as any protected virtual machine is running. After block 350, these steps conclude.

Figure 4:
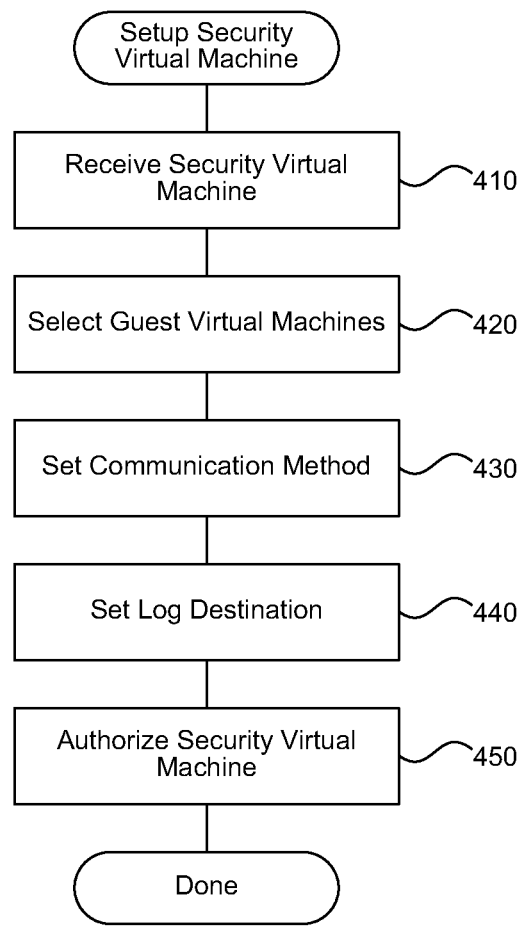
FIG. 4 is a flow diagram that illustrates processing of the host component to setup a privileged virtual machine, in one embodiment.

FIG. 4 is a flow diagram that illustrates processing of the host component to setup a privileged virtual machine, in one embodiment. Beginning in block 410, the component receives the privileged virtual machine. For example, the privileged virtual machine may include a configuration file that specifies the virtual hardware and other information that defines the privileged virtual machine environment. The privileged virtual machine may also include one or more virtual hard drives that are files containing data storage for the virtual machine. Continuing in block 420, the component selects one or more protected virtual machines for which the privileged virtual machine will be authorized to collect auditing information. A particular privileged virtual machine may be authorized to collect auditing information for all protected virtual machines, or just a subset based on some criteria relevant to an administrator that performs configuration of the privileged virtual machine.

Continuing in block 430, the component sets the communication method that will be used by the protected virtual machines to send auditing information to the privileged virtual machine. The host component may provide more than one method via which virtual machines can communicate, including a network port, storage drive mapped to each virtual machine, a driver run by each virtual machine for communication (e.g., by accessing a shared memory space, named pipe, or other communication service), and so forth. The system designer may choose a communication method that is less susceptible to manipulation by administrators or other users, such as low latency communication methods.

Continuing in block 440, the component sets a log destination for the auditing information that the privileged virtual machine collects. For example, the privileged virtual machine may store information in a database, hierarchical folder structures, or other data storage location. Other applications, such as an audit log-viewing tool, may allow administrators to view the collected auditing information. If one or more administrators are suspected of corruption, the component may select a log destination that is configured for appending but not deleting logs. This allows any privileged virtual machine to add new logs but prevents tampering with the audit logs, even by administrators.

Continuing in block 450, the component authorizes the privileged virtual machine to collect audit information from the selected protected virtual machines. For example, authorization may include registering the privileged virtual machine with a hypervisor that each virtual machine accesses to interact with physical hardware. The hypervisor may control which virtual machines can access other virtual machines and receive information such as audit logs. After block 450, these steps conclude.

In some embodiments, the security system includes a hypervisor that will only allow the collection of audit information by an authorized privileged virtual machine. The hypervisor ultimately controls access to the physical hardware and can prevent unauthorized use of the hardware. To prevent tampering with the audit logs, the hypervisor may restrict access to auditing information in various ways, such as by controlling which virtual machines can provide and receive auditing information using the security system.

In some embodiments, the security system provides the ability to monitor the activities of suspect users. For example, the system may allow recording keyboard, mouse, webcam, and screen activity produced by a particular protected virtual machine. This may allow a member of an organization to conduct surveillance on a suspected corrupt user (even an administrator) and store evidence about the user's use of the system. The evidence can be used to investigate or prove unauthorized actions of a suspected individual. The system may allow the recorded information to be played back for later viewing. To collect the information, the system may store data about the user's activities in the audit logs that the privileged virtual machine already collects. The system records this information in a way that the user cannot subvert the collection of the information and might not even be aware of the surveillance.

In some embodiments, the security system restricts access to privileged virtual machines one or more super administrators known to be trustworthy. Although a particular administrator may be suspect, the person using the system to conduct surveillance on the administrator is someone the organization trusts to perform such activities. Normal virtual machine administrators may not be allowed to access or configure privileged virtual machines, so that the ability of the system to monitor administrator activities without tampering remains intact. An administrator's typically unlimited access is what makes catching corrupt administrators or malware run by an administrator so difficult. By creating a restricted virtual machine to which normal administers are not granted access, the system provides the ability to catch corrupt activity.

In some embodiments, the security system includes a hypervisor that prevents tampering with components of the security system. For example, the hypervisor may prevent a guest operating system from uninstalling an agent for collecting auditing information. The agent, described further herein, may be used by the system to collect information from each protected virtual machine and provide it over a virtualization bus or other communication channel to the privileged virtual machine. By preventing tampering, the hypervisor prevents a corrupt administrator from simply uninstalling the agent to prevent the capturing of audit information.

In some embodiments, the security system uploads auditing information to a centralized storage location. As noted herein, the security system described overcomes a weakness of prior systems by avoiding a dependency on a network connection to collect audit information. However, it may still be valuable to collect auditing information to a central location within an organization, such as for broader analysis across multiple systems. Because the security system prevents an administrator from interrupting log collection, the system can upload auditing information to a centralized storage location without the usual advantages of a network dependency. Logging can even take place when the network is down, and the system can upload the audit information when the network is available again. Even if the administrator caused the outage, the administrator cannot tamper with the collected log information because he/she has not access to the privileged virtual machine where the logs are stored.

From the foregoing, it will be appreciated that specific embodiments of the security system have been described herein for purposes of illustration, but that various modifications may be made without deviating from the spirit and scope of the invention. Accordingly, the invention is not limited except as by the appended claims.

We claim:

1. A method performed by a computing device having a processor, the method comprising:
   receiving, with the processor, an indication to start collecting auditing information from an auditing information source having one or more protected virtual machines from outside of the one or more protected virtual machines, wherein the auditing information includes one or more events of user actions on the one or more protected virtual machines and corresponding users associated with the one or more events;
   receiving the auditing information from the identified auditing information source during operation of the one or more protected virtual machines;
   storing the received auditing information in a log location outside of the one or more protected virtual machines along with identifying information of the auditing information source; and
   protecting the received and stored auditing information from modification by one or more users having an account on the one or more protected virtual machines regardless of privilege levels of the one or more users with respect to the one or more protected virtual machines.

2. The method of claim 1 wherein the method is invoked by a host operating system that starts a privileged virtual machine that performs the method.

3. The method of claim 1 wherein receiving the indication to start collecting the auditing information comprises running an application on a host operating system to collect the auditing information from the one or more protected virtual machines.

4. The method of claim 1, further comprising enumerating the one or more protected virtual machines for which the auditing information is collected.

5. The method of claim 1, further comprising repeating receiving the auditing information and storing the received auditing information for each of the one or more protected virtual machines hosted by a host operating system.

6. The method of claim 1 wherein receiving the auditing information from the identified auditing information source comprises receiving the auditing information via a virtualization bus.

7. The method of claim 1 wherein receiving the auditing information from the identified auditing information source comprises receiving the auditing information via a network interface.

8. The method of claim 1 wherein receiving the auditing information from the identified auditing information source comprises receiving the auditing information via a file system interface.

9. The method of claim 1 wherein receiving the auditing information from the identified auditing information source comprises receiving information about one or more events as the events occur on the one or more protected virtual machines.

10. The method of claim 9 wherein the events include one or more actions taken by an administrator on the one or more protected virtual machines.

11. The method of claim 1 wherein storing the received auditing information comprises aggregating the auditing information from the one or more protected virtual machines along with information indicating which one of the one or more protected virtual machines is the source of each event.

12. A computer system for securely collecting auditing information, the system comprising:
a processor and a memory containing software instructions that when executed by the processor, cause the processor to perform a process including;
hosting, in a root partition, plurality of virtual child partitions, wherein at least one of the virtual child partitions includes a protected virtual machine, and wherein at least another one of the virtual child partitions includes a privileged virtual machine;
abstracting differences between physical hardware associated with the computer system and virtual hardware provided to each of the protected virtual machine and privileged virtual machine;
receiving auditing information from the protected virtual machine and storing the received auditing information in an audit log on the privileged virtual machine, the received auditing information being protected from modification by one or more users having an account with the protected virtual machine regardless of privilege levels of the one or more users with respect to the protected virtual machine, and wherein the auditing information includes one or more events of user actions on the protected virtual machine and corresponding users associated with the one or more events; and
providing a channel through which the auditing information is received from the protected virtual machine.

13. The computer system of claim 12 wherein the process performed by the processor further includes running an operating system that includes a virtualization stack and device drivers through which the protected virtual machine or the privileged virtual machine interacts with physical hardware on the computer system.

14. The computer system of claim 12 wherein the process performed by the processor further includes operating a hypervisor that sits in a conceptual stack below a host operating system and each of the protected or privileged virtual machines to abstract the physical hardware from the root partition and the virtual child partitions.

15. The computer system of claim 12 wherein the privileged virtual machine runs alongside the protected virtual machine.

16. The computer system of claim 12 wherein the process performed by the processor further includes authorizing the privileged virtual machine to receive the auditing information from the protected virtual machine through a hypervisor.

17. The computer system of claim 12 wherein receiving the auditing information includes running an application of a host operating system to collect the auditing information from the protected virtual machine.

18. The computer system of claim 12 wherein the process performed by the processor further includes executing within the protected virtual machine to collect the auditing information and sending the collected auditing information to be stored in the audit log.

19. A computer-readable storage device comprising instructions for controlling a computer system to configure a privileged virtual machine, wherein the instructions, when executed, cause a processor to perform actions comprising:
receiving configuration information defining the privileged virtual machine;
initiating the defined privileged virtual machine before initiating one or more protected virtual machines;
receiving designation of one or more of the initiated protected virtual machines for which the privileged virtual machine is authorized to collect auditing information including one or more events of user actions on the one or more of the protected virtual machines and corresponding users associated with the one or more events;
receiving authorization that allows the privileged virtual machine to start collecting auditing information from the designated one or more protected virtual machines;
in response to receiving the authorization, with the privileged virtual machine, collecting the auditing information from the designated one or more protected virtual machines; and
storing the collected auditing information from the designated one or more protected virtual machines in a log destination, the log destination being inaccessible to a user having an account with the one or more designated protected virtual machines regardless of a privilege level of the user with respect to the one or more designated protected virtual machines.

20. The computer-readable storage device of claim 19 wherein collecting the auditing information includes:
receiving, at the privileged virtual machine, a notification of event of user action on one of the designated protected virtual machines;
transmitting, from the privileged virtual machine to the one of the designated protected virtual machines, an acknowledgement that storing the event is successful; and
in response to receiving the transmitted acknowledgement, with the one of the designated protected virtual machines, performing the user action associated with the stored event.

* * * * *